Figure 5:
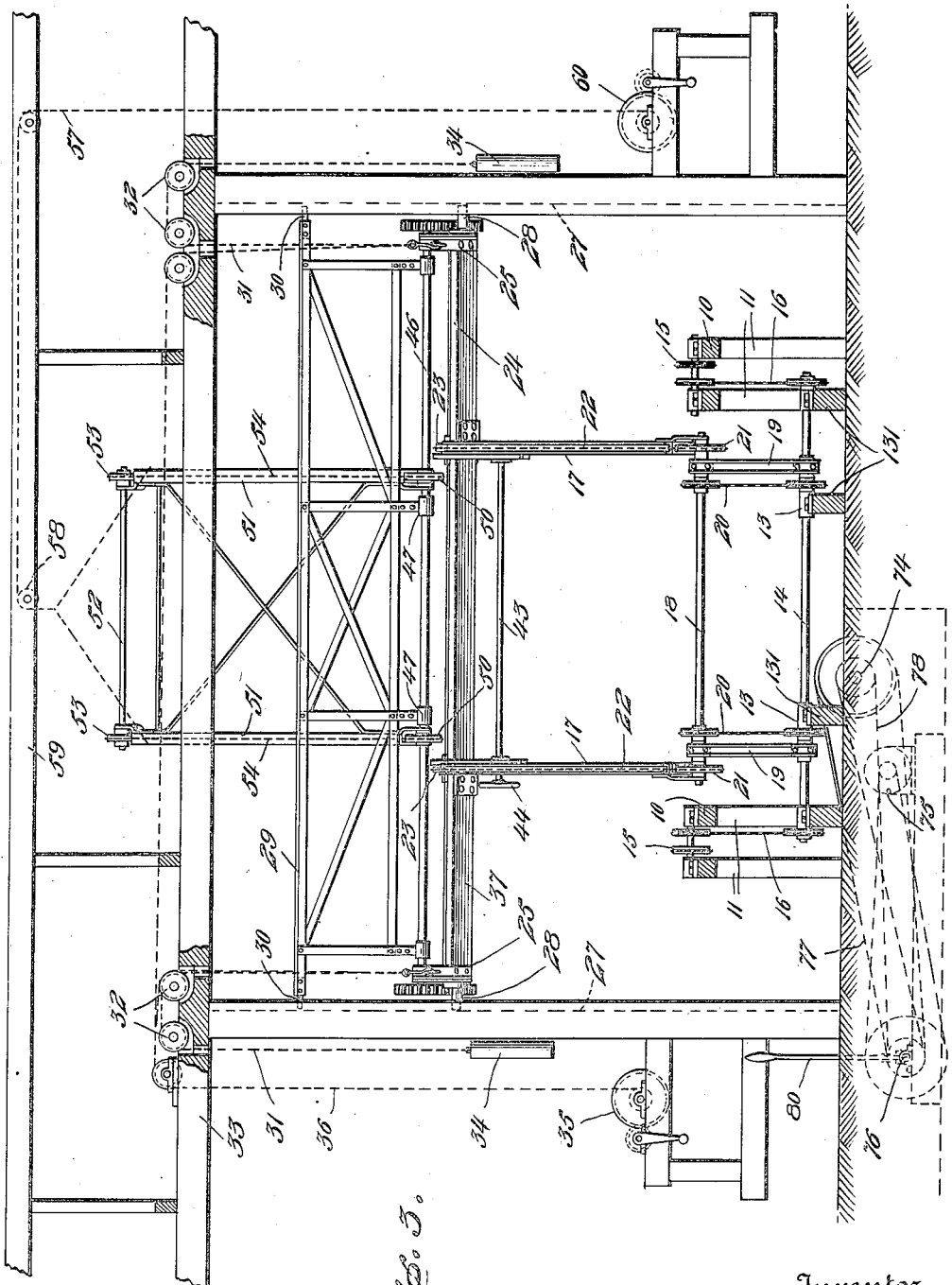

C. E. EVANS.
LUMBER STACKER AND UNLOADER.
APPLICATION FILED OCT. 17, 1913.
1,128,671.
Patented Feb. 16, 1915.
3 SHEETS—SHEET 1.
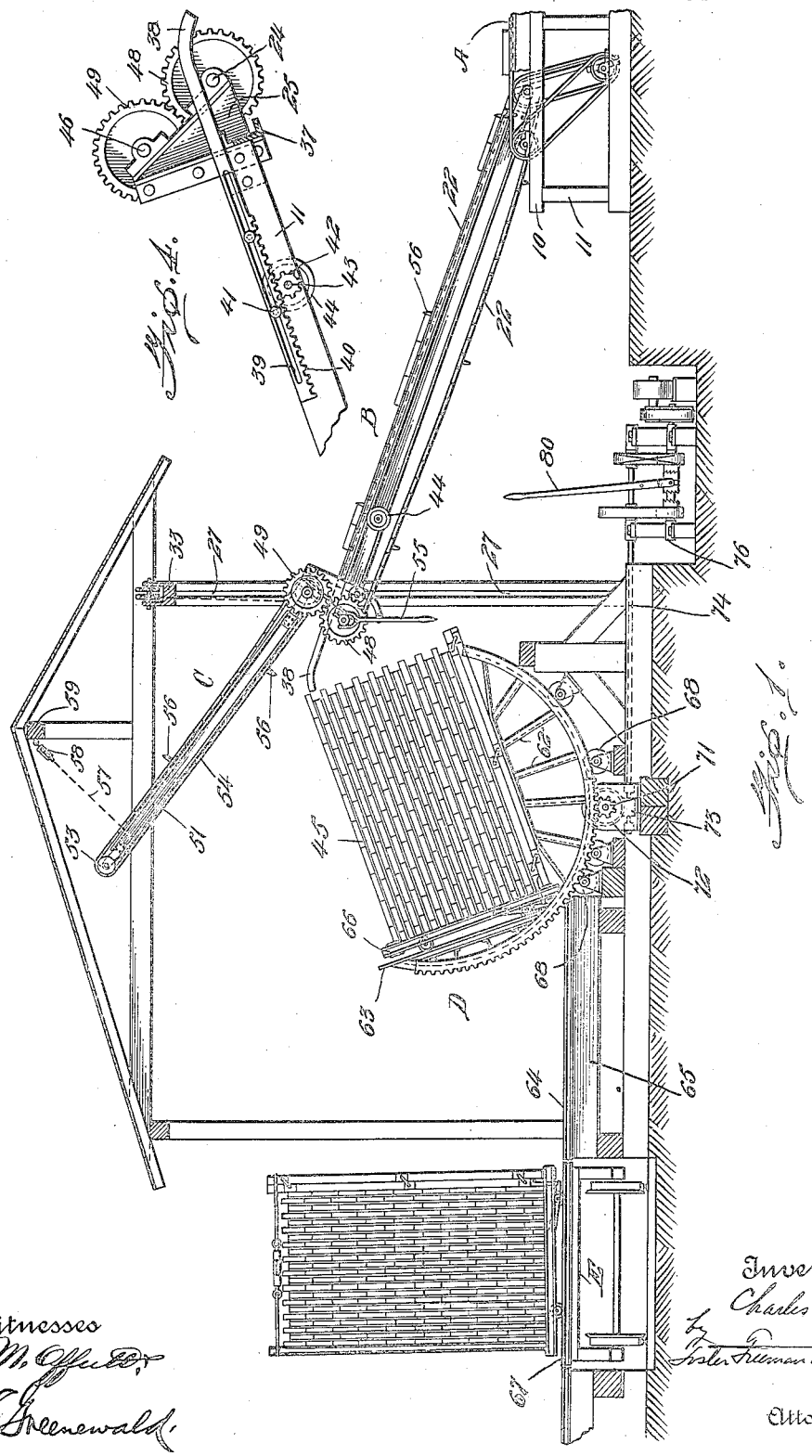

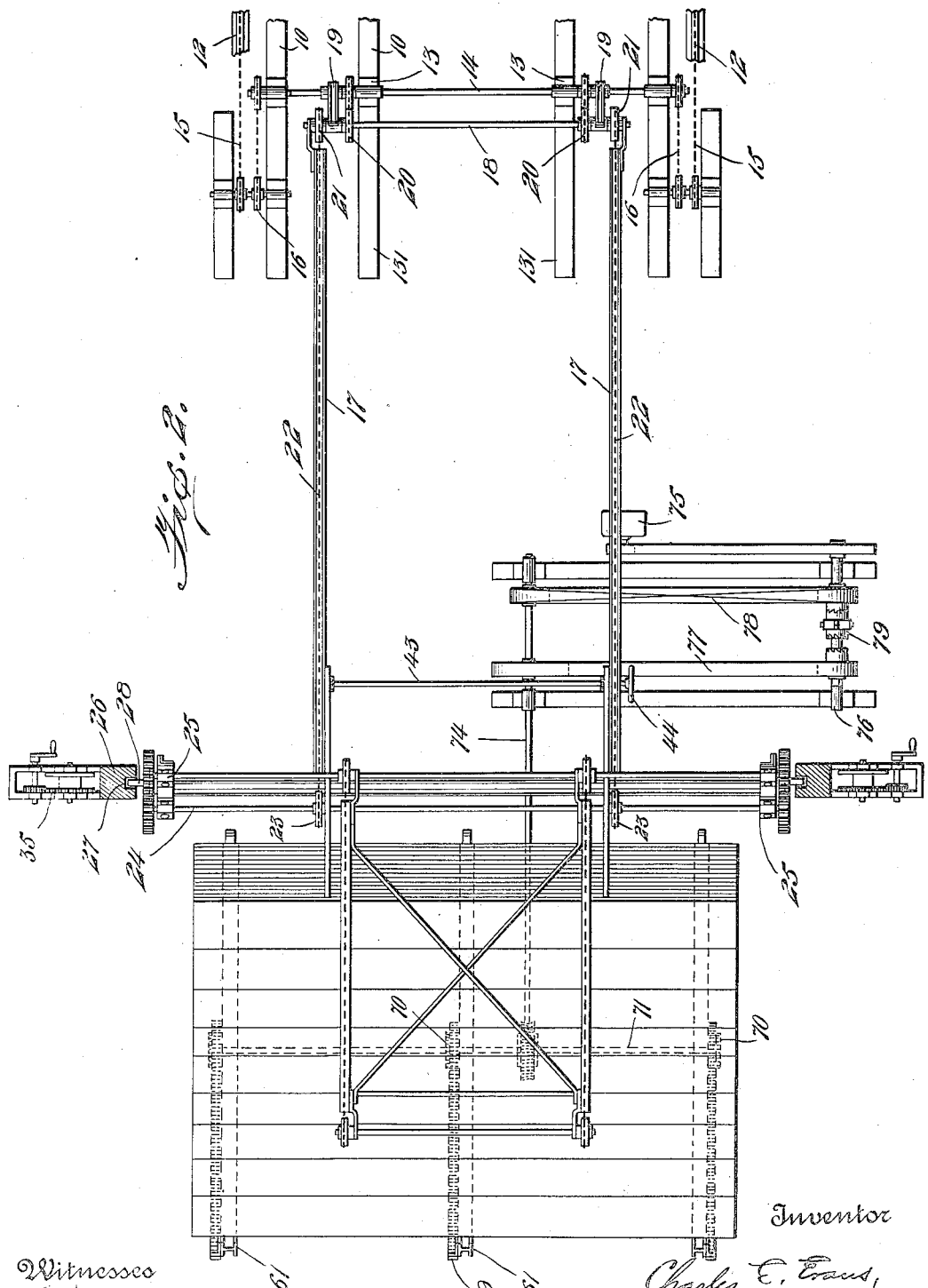

C. E. EVANS.
LUMBER STACKER AND UNLOADER.
APPLICATION FILED OCT. 17, 1913.

1,128,671.

Patented Feb. 16, 1915.
3 SHEETS—SHEET 3.

Witnesses
Inventor
Charles E. Evans,
by Foster Freeman Watson & Coit
Attorneys of the arms 19, the latter having suitable bosses at their ends to engage both shafts and permit rotation thereof. The shaft 18 is driven by the shaft 14, the drive connection being effected by means of the sprocket and chain connection

UNITED STATES PATENT OFFICE.

CHARLES E. EVANS, OF WEED, CALIFORNIA.

LUMBER STACKER AND UNLOADER.

1,128,671. Specification of Letters Patent. Patented Feb. 16, 1915.

Application filed October 17, 1913. Serial No. 795,727.

*To all whom it may concern:*

Be it known that I, CHARLES E. EVANS, a citizen of the United States of America, and resident of Weed, county of Siskiyou, State of California, have invented certain new and useful Improvements in Lumber Stackers and Unloaders, of which the following is a specification.

This invention relates to mechanism for loading and unloading lumber.

The object of the invention is to provide a simple device for stacking lumber on suitable cars for the purpose of transporting the same to any convenient place, the mechanism being particularly adapted for use in connection with kiln driers.

The objects and novel features of the invention will be apparent from the following description, taken in connection with the drawings, in which—

Figure 1 is a side elevation of a mechanism embodying my invention; Fig. 2 is a plan view of the same; Fig. 3 is a rear end elevation; and Fig. 4 is an enlarged detail view of one end of the loading skid.

Referring to the drawing, A designates generally the sorting table; B, the loading skid; C, the unloading skid; D, the stacker; and E, the transfer car.

The lumber as it leaves the kiln is placed upon a sorting table A which in the present showing comprises a series of timbers 10 supported by the uprights 11 and having at its opposite sides a chain or other suitable conveying mechanism 12 which moves the lumber along the table, the lumber being so placed thereon that its opposite ends will rest upon the chains. A shaft 14 is mounted adjacent the end of and below the table A in suitable bearings 13 on the timbers 131. The chains 15 which move the lumber lengthwise of the sorting table A are connected by means of the chain and sprocket or other gearing 16 to drive the shaft 14.

The loading skid B comprises a frame composed of two parallel spaced I-beams 17 which are connected at one end to the ends of the counter-shaft 18, rockably supported on the shaft 14 by means of the arms 19, the latter having suitable bosses at their ends to engage both shafts and permit rotation thereof. The shaft 18 is driven by the shaft 14, the drive connection being effected by means of the sprocket and chain connection 20, the sprockets thereof being rigidly mounted on the respective shafts.

Mounted at each end of the counter-shaft 18 is a sprocket wheel 21 which drives an endless chain or other suitable conveying device 22, the top flight of each chain moving along the upper face of the I-beams 17, 17. The chains 22 pass around sprockets 23 which are secured to rotate with the shaft 24 journaled in brackets 25 at the outer ends thereof. The brackets 25 thus support the upper end of the loading skid B, and are slidable vertically along the timbers 26. The said timbers 26 are each provided at their inner faces with a groove 27 to receive a pin 28 mounted on the adjacent face of each of the brackets 25 whereby the brackets and parts carried thereby are guided in a vertical direction. To further steady the construction an additional frame 29 is also provided with pins 30 to move in the slots 27. Each of the cables 31, being attached at one end to a bracket 25 and passing over guide pulleys 32 mounted on the stringer 33, has a suitable counterweight 34 attached to its other end by means of which the outer end of the loading skid may be supported in its adjusted position. A suitable winch 35 is provided with cables 36 attached to the two brackets at the ends of the shaft 24 so as to provide a means whereby the free end of the structure may be raised along its guideways.

An angle iron or suitable rigid connection 37 is secured to each of the brackets 25 and the outer end of the I-beams 17 comprising the loading skid are riveted or otherwise secured thereto, thus forming a rigid frame-like structure of the loading skid so that the lumber may pass from the same onto the stacker D. Bars 38, 38, curved downwardly at their outer ends and each provided with a longitudinal slot 39 and rack teeth 40 along one edge are secured to the outer end of each I-beam. Spaced pins 41 carried by each I-beam 17 extend through the slots 39 of the bar 38 and form a guide and supporting means therefor. Pinions 42 which mesh with the racks 40 of the bars 38 are mounted on a shaft 43 provided with a hand wheel 44 whereby the bars 38 may be moved outwardly beyond the ends of the I-beams 17. The bars 38 consequently form an adjustable extension of the skid so that as the frame structure constituting the skid is raised and lowered in the guide-ways 27, the length of the skid may be altered as necessity demands, the end of the extensible part being kept in close proximity to the edge of the stack of lumber 45 on the stacker D.

The cross shaft 46 is mounted in suitable bearings 47 of the frame 29 and at its ends is also carried in bearings in the brackets 25. Meshing gear wheels 48 and 49 mounted respectively on the outer ends of the shafts 24 and 46 serve to transmit motion from the shaft 24 and its driving means to the shaft 46 which latter has fixed thereto the sprocket wheels 50. The unloading skid C comprises a frame made up of a pair of spaced parallel I-beams 51 rockable at their inner ends on the cross-shaft 46 and connected at their outer ends by the shaft 52 which carries the sprockets wheel 53 in line with the sprocket wheels 50. An endless chain 54 passes around each pair of sprocket wheels 50 and 53 and is driven thereby. A suitable mechanism operated by the lever 55 is arranged to throw the gear wheels 48 and 49 into and out of mesh, as while the skid B is loading the stacker D, there is no necessity for the operation of the unloading skid C. The chains or other conveying devices arranged on the skids B and C may be provided with suitable hooks 56 which serve to positively engage the lumber and move it along. A suitable cable 57 passes over guide pulleys 58 on the stringer 59 and is connected to the I-beams 51 of the unloading skid C, and by means of the winch 60 the latter may be raised and lowered as desired. In lowered position, the free end thereof will move down and engage the top layer of lumber on the stacker and when driven in the proper direction the hooks thereof will engage and remove the lumber from the stacker D onto the extension 38 or onto the skid B proper.

The stacker comprises three substantially semi-circular I-beams 61 connected together by cross-members to form a frame or cradle, upright members 62 being provided to form a supporting surface for the stack of lumber. Rails 63 may be fastened to each of the I-beams 61 and when the stacker is in upright position the said rails will register with the rails 64 on the loading platform 65 from whence the stack of lumber carried by the car 66 is rolled onto rails 67 on the transfer car E.

The stacker D is rotatably supported on a series of rollers 68, the said rollers engaging between the flanges of the I-beams 61. Each of the I-beams 61 has a segmental rack 69 secured thereto and the stacker may be rocked by means of three gears 70, mounted on the shaft 71, each of said gears engaging one of the said racks 69. A worm wheel 72 secured to the shaft 71 meshes with a worm 73 mounted on the shaft 74. Any suitable device, such as the electric motor 75, which drives the shaft 76, may serve to rotate the shaft 74 in the proper direction, the straight belt 77 and cross-belt 78 being connected to the drive shaft 76 by means of the clutch 79 operated by the lever 80.

The operation of the device will be clear from the foregoing description.

The device is suitable for the purpose of stacking lumber as well as unloading lumber. In loading lumber, the car 66 is held at an angle of about 20° more or less, the lumber being delivered to the car from the sorting table by means of the adjustable skid, the latter being raised as the height of the stack increases and the extension thereof being simultaneously moved out. The end of the skid B adjacent the sorting table is rockable so that the opposite end of the skid may move in its vertical guideways. In the unloading operation the entire load is dropped to a horizontal position and the unloading skid C is brought into play by dropping the free end thereof on top of the load and throwing the driving mechanism thereof into gear with the mechanism which drives the conveying means on the skid B. The unloading operation is simply a matter of reversing the entire machinery consisting of sorting table A, loading skid B, and unloading skid C.

It will be apparent that numerous modifications will suggest themselves and therefore I do not wish to be limited to the exact details as shown and described.

Having thus described the invention, what I claim is:

1. In an unloading mechanism, the combination of a primary frame capable of being adjusted at a plurality of inclinations, conveying means extending longitudinally of said frame, a secondary frame located at the upper end of said primary frame, conveying means extending longitudinally of said secondary frame, and means whereby the conveying means on the secondary frame may be driven from the conveying means on the primary frame and in the opposite direction, the lower flight of the conveying means on the secondary frame delivering to the conveying means on the primary frame and traveling continuously in the same direction as the upper flight of the conveying means on the primary frame in order to unload the material.

2. In an apparatus of the class described, the combination of a frame comprising side members rockably mounted at one end and vertically movable at the opposite end, means for conveying lumber lengthwise of said frame, a lumber receiving device located at the vertically movable end of said frame, and means attached to the side members of said frame and extensible beyond the end of the conveying means on said frame for extending the effective length of said frame to the lumber receiving device as the height of the stack of lumber increases.

3. In an apparatus of the class described, the combination of a frame rockably mounted at one end and vertically movable at its opposite end, a second frame supported adjacent the vertically movable end of the first frame and having its opposite end freely movable, conveying means carried by both frames, said conveying means being capable of being driven in either direction, and means for connecting and disconnecting the conveying means of said second frame with the conveying means of the first mentioned frame, the conveying means on the first mentioned frame when operating alone in one direction constituting part of a loading mechanism and, constituting part of an unloading mechanism when moving in the opposite direction and operating in conjunction with the conveying means of said second mentioned frame.

4. In an apparatus of the class described, the combination of a frame rockable at one end and vertically movable at its opposite end, a lumber receiving device located at the vertically movable end of said frame, and a second frame suspended at one end above the lumber receiving device and pivotally connected at its opposite end with the first mentioned frame and adapted to be lowered into contact with the said lumber on said lumber receiving device to unload lumber therefrom, and conveying means on both frames.

5. In a loading and unloading mechanism the combination of a frame comprising parallel I-beams, conveying means on said frame, means for rockably supporting said I-beams at one end, guide ways at the opposite end of said frame, means for moving one end of the frame up and down along said guide ways, bars slidable along the I-beams for extending the length of the frame beyond the conveying means, and means for operating said bars.

6. In a loading and unloading mechanism, the combination of a stationary frame structure comprising standards provided with guiding means extending longitudinally thereof, a bodily movable frame having devices at one end fitting the guiding means of said standards, primary conveying means on said frame, means at the other end of said frame for pivotally supporting it and for driving said conveying means thereon, means for moving one end of said frame vertically along said standards, a second conveying means attached to said vertically movable end, and means whereby one end of said second conveying means may be raised and lowered independently of said primary conveying means and said frame.

7. In a loading and unloading device of the class described, the combination of a frame rockable at one end and vertically movable at its opposite end, means for moving the said vertically movable end and for maintaining the same in a predetermined position, a second frame pivotally supported adjacent the vertically movable end of the first frame and having a freely movable end, and means whereby the free end of said second frame may be raised and lowered.

8. In a mechanism of the class described, the combination of a pivoted frame comprising a pair of beams, conveying means movable along said beams, and means for extending the effective length of said frame beyond the conveying means, comprising a pair of rack bars slidable longitudinally of said beams and independently of said conveying means, pinions capable of meshing with said rack bars, and means for operating said pinions to move the rack bars.

9. In a loading and unloading mechanism the combination of a stationary frame structure, a frame rockable at one end and vertically movable at its opposite end, a second frame structure pivoted to the first mentioned structure at one end and suspended from the stationary frame structure at its opposite end whereby it is freely movable at its opposite end, means for raising and lowering the free movable end of the second frame, and conveying means on both frames.

10. In a loading and unloading mechanism the combination of a frame rockably mounted at one end and vertically movable at its opposite end and comprising a pair of parallel side members, a transverse member connecting the vertically movable ends of said side members, brackets mounted on said transverse member, a pair of parallel shafts journaled in said brackets, a second frame pivoted on one of said shafts and freely movable at its opposite end, conveying means on the first mentioned frame driving one of said shafts and the shaft to which said second mentioned frame is pivoted, and conveying means on said second frame driven by the last mentioned shaft.

11. In an unloading mechanism, the combination of a primary frame capable of being adjusted at a plurality of inclinations, conveying means extending longitudinally of said primary frame, a secondary frame located at the upper end of said primary frame, conveying means on said secondary frame capable of moving material downwardly onto the conveying means on said primary frame, and means whereby the conveying means on the secondary frame may be driven in a direction opposite to the conveying means on the primary frame, the lower flight of the conveying means on the secondary frame delivering to the conveying means on the primary frame and traveling continuously downward in the same direction as the upper flight of the conveying means on the primary frame in unloading material.

In testimony whereof I affix my signature in presence of two witnesses.

CHARLES E. EVANS.

Witnesses:
J. G. COTCHETT,
R. P. CLARK.